(12) United States Patent
Castellani et al.

(10) Patent No.: US 7,120,343 B2
(45) Date of Patent: Oct. 10, 2006

(54) OPTICAL FIBER WITH EPOXIDIZED POLYOLEFIN BASED COATING

(75) Inventors: Luca Castellani, Corsico (IT); Luigia Rossiello, Bitonto (IT); Andrea Pelizzoni, Bovisio Masciago (IT); Raffaella Donetti, Ghemme (IT); Lidia Terruzzi, Triuggio (IT); Mauro Maritano, Monza (IT)

(73) Assignee: Perelli & C. S.p.A., Milan (IT)

( * ) Notice: Subject to any disclaimer, the term of this patent is extended or adjusted under 35 U.S.C. 154(b) by 0 days.

(21) Appl. No.: 11/231,149

(22) Filed: Sep. 21, 2005

(65) Prior Publication Data

US 2006/0056790 A1 Mar. 16, 2006

Related U.S. Application Data

(63) Continuation of application No. 10/497,697, filed as application No. PCT/EP02/13447 on Nov. 28, 2002, now Pat. No. 6,996,318.

(30) Foreign Application Priority Data

Dec. 6, 2001 (WO) .................. PCT/IB01/02326
Feb. 18, 2002 (EP) .................. 02003650

(51) Int. Cl.
*G02B 6/02* (2006.01)
*G02B 6/18* (2006.01)

(52) U.S. Cl. .............. 385/128; 385/126; 385/127; 385/141; 385/143; 385/145; 427/163.1; 427/162

(58) Field of Classification Search ............. 385/127, 385/128, 141, 143, 145, 123, 126, 142, 144; 427/162, 163.1

See application file for complete search history.

(56) References Cited

U.S. PATENT DOCUMENTS

| | | | |
|---|---|---|---|
| 4,039,593 A | 8/1977 | Kamienski et al. ..... 260/635 E |
| 4,474,830 A | 10/1984 | Taylor ................. 427/54.1 |
| 4,879,349 A | 11/1989 | Hoxmeier ............... 525/332.8 |
| 5,247,026 A | 9/1993 | Erickson et al. ......... 525/331.9 |
| 5,264,480 A | 11/1993 | Bening et al. ............ 524/505 |
| 5,536,772 A | 7/1996 | Dillman et al. .......... 524/483 |
| 5,916,941 A | 6/1999 | St. Clair ................ 524/321 |
| 5,993,965 A | 11/1999 | Flat et al. .............. 428/375 |
| 6,042,943 A | 3/2000 | Levy ................... 428/378 |
| 6,292,613 B1 | 9/2001 | Fort ................... 325/128 |
| 6,996,318 B1 * | 2/2006 | Castellani et al. ........ 385/128 |
| 2002/0168163 A1 | 11/2002 | Szum et al. ............. 385/128 |
| 2003/0002845 A1 | 1/2003 | Chawla et al. ........... 385/141 |

(Continued)

FOREIGN PATENT DOCUMENTS

EP 0 124 057 A1 11/1984 ............. 385/128 X (Continued)

*Primary Examiner*—Brian M. Healy
(74) *Attorney, Agent, or Firm*—Finnegan, Henderson, Farabow, Garrett & Dunner, L.L.P.

(57) ABSTRACT

An optical fiber having at least one epoxidized polyolefin based polymer coating. The coating is formed from a crosslinkable composition having (a) at least one epoxidized polydiene oligomer having a first and a second end, the oligomer having at least one hydrocarbon chain that is substantially free of ethylenic double bonds, at least one epoxide group at the first end and at least one reactive functional group at the second end; (b) at least one hydrogenated polydiene oligomer having at least one reactive functional group capable of reacting with the epoxide groups; and (c) at least one photo-initiator. Preferably, the coating is a primary coating coated with a secondary coating.

44 Claims, 2 Drawing Sheets

U.S. PATENT DOCUMENTS

2003/0147615 A1    8/2003    Szum et al. ................ 385/128

FOREIGN PATENT DOCUMENTS

| EP | 0 516 203 A2 | 12/1992 | ............ 385/128 X |
| EP | 0 533 397 A1 | 3/1993 | ............ 385/128 X |
| EP | 1 112 979 A1 | 7/2001 | ............ 385/128 X |
| JP | 55-065242 | 5/1980 | ............ 385/128 X |
| WO | WO 99/26891 | 6/1999 | ............ 385/128 X |
| WO | WO 99/67180 | 12/1999 | ............ 385/128 X |

* cited by examiner

US 7,120,343 B2

OPTICAL FIBER WITH EPOXIDIZED POLYOLEFIN BASED COATING

CROSS REFERENCE TO RELATED APPLICATIONS

This application is a continuation of U.S. application Ser. No. 10/497,697, filed Jun. 4, 2004, now U.S. Pat. No. 6,996,318 which is a national phase application based on PCT/EP02/13447, filed Nov. 28, 2002, and claims the priority of International Application No. PCT/IB01/02326, filed Dec. 6, 2001, and European Patent Application No. 02003650.5, filed Feb. 18, 2002, all of which are herein incorporated by reference.

BACKGROUND OF THE INVENTION

1. Field of the Invention

The present invention relates to an optical fiber comprising at least one epoxidized polyolefin based coating layer, and to a crosslinkable composition which can be applied as said coating.

More particularly, the present invention relates to an optical fiber comprising at least one epoxidized polyolefin based primary coating layer and at least one secondary coating layer deposited around said primary coating, and to a crosslinkable composition which can be applied as said primary coating.

2. Description of the Related Art

Optical fibers commonly consist of a glass portion (typically with a diameter of about 125 μm), inside which the transmitted optical signal is confined, and of a coating, typically polymeric, arranged around the glass portion for substantially protective purposes. This protective coating typically comprises a first coating layer positioned directly onto the glass surface, known as the "primary coating" or "primary" for short, typically having a thickness of between about 25 μm and about 35 μm. In turn, this primary coating is generally covered with a second coating layer, known as the "secondary coating" or "secondary" for short, typically having a thickness of between about 10 μm and about 30 μm.

These polymer coatings may be obtained from compositions comprising oligomers and monomers that are generally crosslinked by means of UV irradiation in the presence of a suitable photo-initiator. The two coatings described above differ, inter alia, in terms of the modulus of elasticity of the crosslinked material. As a matter of fact, whereas the material which forms the primary coating is a relatively soft material, with a relatively low modulus of elasticity at room temperature, the material which forms the secondary coating is relatively harder, having higher modulus of elasticity values at room temperature. The combination of said two layers of coating ensures adequate mechanical protection for the optical fiber.

The optical fiber thus composed usually has a total diameter of about 250 μm. However, for particular applications, this total diameter may also be smaller; in this case, a coating of reduced thickness is generally applied.

The crosslinking of the abovementioned compositions, depending on the reactive groups present in the compounds (oligomers and monomers) to be crosslinked, may take place, for example, via a free-radical or cationic route. Typically, the crosslinking of compounds comprising epoxide groups takes place cationically.

For example, patent application EP 124 057 describes a cationically crosslinkable liquid composition comprising a polyepoxide, a polysiloxane bearing a plurality of hydroxyalkyl groups in the molecule, and a photo-initiator and/or a photo-sensitizer. According to the assertions made in the application, said composition is capable of providing a coating for optical fibers that is capable of maintaining low modulus of elasticity values at low temperatures (−60° C.) so as to avoid the phenomenon known as "microbending", with consequent attenuation of the transmitted signal.

Patent application EP 533 397 describes an optical fiber with a coating which includes at least one layer comprising a cationically crosslinkable composition. Said composition comprises a resin containing cationically crosslinkable end groups, a diluent containing cationically crosslinkable end groups, and a photo-initiator. Resins that are useful for this purpose may be selected from vinyl ether resins and epoxy resins. According to the assertions made in the application, said cationic crosslinking leads to the formation of an acid medium in contact with the glass portion of the optical fiber, making it possible to obtain an optical fiber with improved mechanical strength.

Patent U.S. Pat. No. 6,042,943 describes a radiation-crosslinkable composition which may be used as primary coating for an optical fiber, comprising: (a) a compound comprising (i) a saturated aliphatic chain, and (ii) at least one epoxide group at one end and at least one reactive function, which may be selected from acrylates, vinyl ethers, hydroxyls, or combinations thereof, at the other end; (b) a blend of acrylate-type monomers comprising (iii) a first monomer containing an acrylate group, and (iv) a second monomer containing at least two acrylate groups; and (c) a photo-initiator. According to a further embodiment, (b) is a blend of monomers comprising (iii) a first monomer containing an acrylate group or a vinyl ether group, and (iv) a second monomer containing at least two functional groups which may be selected from acrylates, epoxides, vinyl ethers and hydroxyls. According to a further embodiment, (b) is a blend of monomers of vinyl ether type comprising (iii) a first monomer containing a vinyl ether group, and (iv) a second monomer containing at least two vinyl ether groups. According to a further embodiment, (b) is a monoacrylate residue containing from 6 to 20 carbon atoms.

Patent U.S. Pat. No. 5,993,965 describes a fiber with a coating based on a hydrophobic material derived from the photo-polymerization of a composition comprising at least one epoxidized polydiene oligomer, at least one photo-initiator and, optionally, a reactive diluent of monomeric type. According to the assertions made in the patent, the fibers thus coated are said to have improved mechanical behaviour. In particular, said coating is used in optical fibers.

As observed by the Applicant, the use of reactive diluents of monomeric type, that are generally required to obtain compositions whose viscosity allows them to be applied to optical fibers at room temperature, may present some drawbacks. For example, the relatively low molecular weight of these monomer components is connected with a relatively high volatility, with a consequent contamination of other materials and/or risks to the environment and to the health of the workers. In addition, following the crosslinking by UV irradiation, residues of unreacted components may remain in the final resin. The presence of these unreacted monomer residues within the polymer network may result in unwanted phenomena of extraction by water and/or water-blocking fillers commonly used in optical cables to prevent or limit the entry of water into the structure of the cable. This extraction entails a worsening in the mechanical properties and may also result in the initiation of the phenomenon of delamination of the fiber, i.e. detachment of the polymer coating from the glass portion of the fiber, with possible generation of the phenomenon known as "microbending".

SUMMARY OF THE INVENTION

The Applicant has now found that the use of a hydrogenated polydiene oligomer comprising at least one reactive function, preferably at least one reactive end function, makes it possible to obtain compositions with an acceptable viscosity at room temperature, with little or no use of conventional diluent monomers. The use of a composition according to the invention makes it possible to obtain a polymer coating for an optical fiber, in particular a primary coating, with improved properties such as, for example, relatively low modulus of elasticity values at the normal working temperatures of said fiber, in particular at low temperatures. Said compositions show reduced toxicity by virtue of the lower volatility of the components and, thus, fewer risks not only as regards the contamination of other materials, but also as regards the environment and the health of the workers. In addition, said compositions show improved behaviour both in the presence of water and in the presence of waterblocking fillers.

The Applicant has also observed that, while conventional polymer coatings are applied at room temperature, the use of the abovementioned oligomer instead of the abovementioned reactive diluents of the monomeric type makes it possible to work at higher application temperatures. The possibility of working at higher temperatures without the risk of volatilization of the low molecular weight components makes it possible also to use compositions that, at room temperature, have a viscosity that is higher than those normally used, to increase the crosslinking rate and to avoid a further crosslinking treatment ("post-curing") of the already-coated optical fiber. Higher application temperatures allows also to avoid cooling the fiber at room temperature before the application of the coating.

In particular, the abovementioned oligomer is advantageously used as a blend with an epoxidized polydiene oligomer comprising at least one hydrocarbon chain that is substantially free of ethylenic double bonds.

According to a first aspect, the present invention thus relates to an optical fiber comprising at least one epoxidized polyolefin based polymer coating, characterized in that said coating is formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups;
(c) at least one photo-initiator.

According to a preferred embodiment of the present invention, said composition optionally comprises at least one adhesion promoter (d).

According to a further preferred embodiment, said polymer coating is a primary coating, preferably coated with a secondary coating.

According to a further aspect, the present invention relates to a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups;
(c) at least one photo-initiator.

According to a preferred embodiment of the present invention, said composition optionally comprises at least one adhesion promoter (d).

According to a further embodiment of the present invention, said composition optionally comprises at least one reactive diluent monomer (e).

According to a preferred embodiment, said crosslinkable composition has a modulus of elasticity, at room temperature, of less than about 4 MPa, preferably between 1 MPa and 3 MPa.

According to a further preferred embodiment, said crosslinkable composition has a modulus of elasticity, at −40° C., of between 5 MPa and 350 MPa, preferably between 10 MPa and 50 MPa.

Said modulus of elasticity is measured using DMTA apparatus (Dynamic Mechanical Thermal Analyser from Reometrics Inc.), in traction, at a frequency of 1 Hz and at a heating rate of 2° C./min.: further details regarding the analysis method will be described in the examples given hereinbelow.

According to a further aspect, the present invention relates to a method for applying an epoxidized polyolefin based polymer coating to an optical fiber, which comprises:
drawing a glass preform placed in a suitable furnace;
cooling the fiber leaving the furnace;
applying said coating;
crosslinking said coating;

characterized in that the application of said coating layer is carried out at a temperature of not less than 60° C., preferably between 80° C. and 120° C.

Preferably, the abovementioned coating is formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups;
(c) at least one photo-initiator.

Generally, said epoxidized polydiene oligomer (a) (referred to hereinbelow for simplicity as "epoxidized compound (a)") is, at room temperature, in the form of a viscous liquid.

The epoxidized compound (a) is generally prepared by anionic (co)polymerization of conjugated diene monomers to give a polydiene according to known techniques as described, for example, in patents U.S. Pat. No. 5,247,026, U.S. Pat. No. 5,536,772, U.S. Pat. No. 5,264,480, U.S. Pat. No. 6,042,943 and patent application EP 516 203.

For example, said (co)polymerization may be carried out in bulk, in solution or in emulsion. In general, in the solution (co)polymerization, an initiator selected, for example, from metals belonging to group IA of the Periodic Table of the Elements, or alkyl, amide, silanol, naphthyl, biphenyl, anthracenyl derivatives thereof, is used, and the polydiene is obtained by (co)polymerizing, simultaneously or sequentially, the conjugated diene monomers. The (co)polymerization reaction is generally carried out at a temperature of between about −150° C. and about 300° C., preferably between 0° C. and 100° C., in a suitable solvent. Preferably, the (co)polymerization initiator is selected from organic compounds of alkali metals such as, for example, organolithium compounds represented by the following general formula:

in which R represents an aliphatic, cycloaliphatic or aromatic hydrocarbon, said aromatic hydrocarbon optionally being substituted with alkyl groups containing from 1 to 20 carbon atoms, and n is an integer between 1 and 4. The polydiene thus obtained may be functionalized by reacting the residual organometallic groups derived from said initiator by reaction with suitable terminating agents such as, for example, low molecular weight alkylene oxides in the presence of small amounts of aliphatic tertiary amines such as, for example, $N,N,N^1,N^1$-tetramethylene-ethylenediamine.

The polydiene thus obtained is then hydrogenated and epoxidized according to known techniques as described, for example, in patent U.S. Pat. No. 4,879,349. The process described in said patent involves the (co)polymerization of substituted or unsubstituted conjugated dienes and the subsequent hydrogenation of the copolymer, working under conditions such that the unsubstituted ethylenic unsaturations present in the copolymer are selectively hydrogenated, while the substituted ethylenic unsaturations present in said copolymer remain substantially non-hydrogenated. The partially hydrogenated polydiene thus obtained is subsequently epoxidized according to known techniques, for example by reaction with an organic peracid (for example peracetic acid or perbenzoic acid).

The hydrogenation and the epoxidation may be carried out in any order. Preferably, the polydiene is first hydrogenated and then epoxidized.

According to a preferred embodiment, the epoxidized compound (a) is obtained by anionic (co)polymerization of conjugated diene monomers containing from 4 to 24, preferably from 4 to 12 carbon atoms selected, for example, from: isoprene, 1,3-butadiene, 2-ethyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene, and mixtures thereof. Disubstituted conjugated diene monomers such as, for example, 2,3-dimethyl-1,3-butadiene, 2,3-dimethyl-1,3-pentadiene, 2,3-dimethyl-1,3-hexadiene, 2,3-dimethyl-1,3-heptadiene, 2,3-dimethyl-1,3-octadiene, or mixtures thereof, may also be used. Alternatively, difluorinated conjugated diene monomers such as, for example, 2,3-difluoro-1,3-butadiene, 2,3-difluoro-1,3-pentadiene, 2,3-difluoro-1,3-hexadiene, 2,3-difluoro-1,3-octadiene, or mixtures thereof, may be used. 1,3-butadiene and isoprene are preferred.

The conjugated diene monomers may optionally be copolymerized with other ethylenically unsaturated monomers such as, for example: α-olefins containing from 2 to 12 carbon atoms (for example ethylene, propylene, 1-butene), monovinylarenes containing from 8 to 20 carbon atoms (for example styrene, 1-vinylnaphthalene, 3-methylstyrene), vinyl esters, in which the ester group contains from 2 to 8 carbon atoms (for example vinyl acetate, vinyl propionate, vinyl butanoate), alkyl acrylates and alkyl methacrylates in which the alkyl contains from 1 to 8 carbon atoms (for example ethyl acrylate, methyl acrylate, t-butyl acrylate, n-butyl acrylate), acrylonitrile, or mixtures thereof.

Preferably, the epoxidized compound (a) is prepared by sequential anionic (co)polymerization working as follows:

(a) anionic polymerization of a first conjugated diene monomer, in particular isoprene;

(b) anionic copolymerization of the polymer obtained in stage (a) with a second conjugated diene monomer, in particular 1,3-butadiene, thus obtaining a block copolymer;

(c) functionalization of the block copolymer obtained in stage (b) with a suitable terminating agent, in particular ethylene oxide;

(d) subsequent selective hydrogenation and epoxidation of the functionalized block copolymer obtained in stage (c).

According to a preferred embodiment, the epoxidized compound (a) is a diblock copolymer comprising a first block comprising at least one epoxide group, obtained by the polymerization of a first conjugated diene monomer, in particular isoprene, which is subsequently epoxidized, and a second block formed from a hydrocarbon chain that is substantially free of ethylenic double bonds, obtained by the polymerization of a second conjugated diene monomer, in particular 1,3-butadiene, subsequently terminated with at least one reactive functional group and hydrogenated. In this case, the hydrocarbon chain that is substantially free of ethylenic double bonds is a poly(ethylene/butylene) chain.

Groups selected, for example, from: aliphatic groups, cycloaliphatic groups, aryl groups, or combinations thereof, may optionally be inserted into the hydrocarbon chain that is substantially free of ethylenic double bonds. Said groups are not incorporated into the main hydrocarbon chain that is substantially free of ethylenic double bonds, but are present in a side chain. In this case, in the epoxidized compound (a), the hydrocarbon chain that is substantially free of ethylenic double bonds may be, for example, poly(ethylene/butylene/styrene).

Preferably, said hydrocarbon chain that is substantially free of ethylenic double bonds has an average (number-average) molecular weight, which may be determined for example by gel permeation chromatography (GPC), of between 2,000 daltons and 10,000 daltons, preferably between 3,000 daltons and 6,000 daltons.

As stated above, the epoxidized compound (a) contains at least one epoxide group at the first end. The number of epoxide groups present in the epoxidized compound (a) may vary according to the epoxidation process used.

According to a preferred embodiment, from 5 to 15 epoxide groups, preferably from 9 to 11 epoxide groups are present in the epoxidized compound (a), at the first end.

As stated above, the epoxidized compound (a) contains at least one reactive functional group at the second end. The expression "reactive functional group" means a group that can react with compounds such as, for example, acrylates, vinyl ethers, epoxides, alcohols or isocyanates. Said reactive functional group may be selected, for example, from hydroxyl, acrylate, epoxy, vinyl ether, mercaptan. When two or more reactive functional groups are present, said groups may be identical to or different from each other.

According to a preferred embodiment, in the epoxidized compound (a), the reactive functional group present at the second end is a hydroxyl group.

When the reactive functional group is a hydroxyl, said group may be converted into other reactive functional groups using techniques known in the art.

The epoxidized compound (a) may be prepared in various forms according to the technique used.

According to a preferred embodiment, the epoxidized compound (a) is a linear, star or radial polymer. The epoxidized compound (a) is preferably a linear polymer.

According to a further preferred embodiment, the epoxidized compound (a) has an average (number-average) molecular weight of between 3,000 daltons and 15,000 daltons, preferably between 5,000 daltons and 7,000 daltons. Said average molecular weight may be determined as described above.

According to a further preferred embodiment, the epoxidized compound (a) has a viscosity, measured at 30° C., of less than 1,000 poise, preferably less than 600 poise, up to 100 poise. Said viscosity may be determined, for example, using a viscometer of Brookfield type, model DV-III, equipped with a configuration 29.

Epoxidized compounds (a) which may be used in the present invention are commercially available, for example, under the brand name Kraton Liquid™ Polymer from Kraton Polymer. Kraton Liquid™ EKP-207 is particularly preferred.

The substantial absence of ethylenic double bonds in the hydrocarbon chain of the epoxidized compound (a) is particularly preferred for the purposes of the present invention, since their presence can cause degradation phenomena (thermal or oxidative degradation or degradation by exposure to ultraviolet light) of said compound. Any degradation might in its turn involve a worsening in the mechanical properties of the polymer coating of the optical fiber. In addition, unwanted phenomena of coloration of said coating might be encountered.

According to a preferred embodiment, the hydrogenated polydiene oligomer (b) (referred to hereinbelow for simplicity as "hydrogenated compound (b)") generally comprises a base polymer structure of synthetic or natural origin, which is derived from the (co)polymerization of one or more conjugated diene monomers, optionally copolymerized with other ethylenically unsaturated monomers.

Conjugated diene monomers that are particularly preferred for the purposes of the present invention are those containing from 4 to 24 carbon atoms, preferably from 4 to 12 carbon atoms, selected, for example, from: 1,3-butadiene, isoprene, piperylene, methylpentadiene, phenylbutadiene, 3,4-dimethyl-1,3-hexadiene, 4,5-diethyl-1,3-octadiene, or mixtures thereof. 1,3-butadiene and isoprene are particularly preferred.

Ethylenically unsaturated monomers that are particularly preferred according to the present invention are, for example: α-olefins containing from 2 to 12 carbon atoms (for example ethylene, propylene, 1-butene), monovinylarenes containing from 8 to 20 carbon atoms (for example styrene, 1-vinylnaphthalene, 3-methylstyrene), vinyl esters in which the ester group contains from 2 to 8 carbon atoms (for example vinyl acetate, vinyl propionate, vinyl butanoate), alkyl acrylates and alkyl methacrylates in which the alkyl contains from 1 to 8 carbon atoms (for example ethyl acrylate, methyl acrylate, methyl methacrylate, t-butyl acrylate, n-butyl acrylate), acrylonitrile, or mixtures thereof.

According to a preferred embodiment, in the hydrogenated compound (b), the reactive functional group may be selected, for example, from: hydroxyl, acrylate, epoxy, vinyl ether, mercaptan. When two or more reactive functional groups are present, said groups may be identical to or different from each other. Preferably, said reactive functional group is a hydroxyl group, more preferably it is a hydroxyl group in an end position. Preferably, the hydrogenated compound (b) has a hydroxyl functionality of between about 0.5 and about 2.6. Said hydroxyl functionality may be determined, for example, according to ASTM standard E222-00.

According to a further preferred embodiment, the hydrogenated compound (b) has a viscosity, measured at 30° C., of between about 10 poise and about 1,000 poise, more preferably between about 20 poise and about 400 poise. Said viscosity may be determined as described above.

According to a further preferred embodiment, the hydrogenated compound (b) has an average (number-average) molecular weight of between about 500 daltons and about 20,000 daltons, more preferably between about 2,000 daltons and about 10,000 daltons. Said average molecular weight may be determined as described above.

According to a further preferred embodiment, the hydrogenated compound (b) containing at least one hydroxyl end function has a hydroxyl-equivalent weight of between about 250 and about 20,000, preferably between about 500 and about 10,000. Said hydroxyl-equivalent weight may be determined, for example, according to ISO standard 3001: 1999.

Hydrogenated compounds (b) that may be used in the present invention are commercially available, for example, under the brand name Kraton Liquid™ Polymer from Kraton Polymer. Kraton Liquid™ L-1203 Polymer and L-2203 Polymer are particularly preferred.

The hydrogenated compound (b) may be prepared according to known techniques. For example, the base polymer may be prepared by (co)polymerization of the corresponding monomers in emulsion, in suspension or in solution. In particular, the base polymers obtained by anionic polymerization in the presence of an organometallic initiator (in particular an organolithium initiator) may be functionalized by reacting the residual organometallic groups derived from said initiator by reaction with suitable terminating agents such as, for example, alkylene oxides or low molecular weight epoxides in the presence of small amounts of aliphatic tertiary amines such as, for example, $N,N,N^1,N^1$-tetramethyleneethylenediamine. Further details regarding the preparation of the hydrogenated polydiene oligomers described above are given, for example, in patents U.S. Pat. No. 4,039,593 and U.S. Pat. No. 5,916,941.

According to a preferred embodiment, the photo-initiator (c) may be selected from salts that are capable of. forming strong acids when subjected to UV irradiation so as to initiate the cationic crosslinking.

Specific examples of photo-initiators (c) which may be used in the present invention are: hexafluorophosphorus triarylsulphonium salts, hexa-fluoroantimony triarylsulphonium salts, (tolylcumyl)tetrakis(pentafluorophenyl)iodonium salts, diaryl-iodonium hexafluoroantimonate salts, or mixtures thereof.

As stated above, the crosslinkable composition according to the present invention may optionally comprise a reactive diluent monomer (e).

According to a preferred embodiment, said reactive diluent monomer (e) may be selected from vinyl ethers such as, for example, n-butyl vinyl ether, n-dodecyl vinyl ether, or mixtures thereof.

For the purposes of limiting the problems outlined above relating to the use of reactive diluent monomers, it is preferable for the amount of reactive diluent monomer added to the crosslinkable composition to be not greater than 20 parts by weight, preferably between 0 parts by weight and 10 parts by weight relative to 100 parts by weight of (a)+(b).

As stated above, the crosslinkable composition according to the present invention may optionally comprise at least one adhesion promoter (d). The adhesion promoter (d) provides increased adhesion between the glass fiber and the primary coating. As observed by the Applicant, while the adhesion between the crosslinked composition and the glass is generally acceptable, in particular on the freshly manufactured optical fiber, this adhesion may nevertheless be impaired upon ageing, with possible undesirable reduction of said adhesion strength. The use of a suitable adhesion promoter thus allows to maintain the value of adhesion strength at an acceptable value, also upon ageing of the optical fiber.

Said adhesion promoter (d) is preferably an organo-functional silane.

For the purpose of the present description and the claims, the term "organo-functional silane" is intended to indicate a silyl compound with functional groups that facilitate the chemical or physical bonding between the glass surface and the silane, which ultimately results in increased or enhanced adhesion between the primary coating and the glass fiber.

Specific examples of organo-functional silanes that may be used in the present invention are: octyltriethoxysilane, methyltriethoxysilane, methyltrimethoxysilane, tris(3-trimethoxysilylpropyl)-isocyanurate, vinyltriethoxysilane, vinyltrimethoxysilane, vinyl-tris(2-methoxyethoxy)silane, vinylmethyl-dimethoxysilane, gamma-methacryloxypropyl-trimethoxysilane, beta(3,4-epoxycyclohexyl)ethyltrimethoxy-silane, gamma-glycidoxypropyltrimethoxysilane, gamma-mercapto-propyltrimethoxysilane, organo-modified polydimethylsiloxane, gamma-ureidopropyltrialkoxysilane, gamma-ureidopropyltrimethoxysilane, gamma-isocyanate-propyltriethoxysilane, or mixtures thereof. gamma-Glycidoxypropyltrimethoxysilane, beta(3,4-epoxycy-cloexhyl) ethyltrimethoxysilane and gamma-mercaptopropyl-trimethoxysilane, are particularly preferred. gamma-Mercaptopropyltrimethoxysilane is more particularly preferred.

Other examples of organo-functional silanes that may be used in the present invention may be identified, for example, by the following structural formula (I):

(R)$_3$Si—C$_n$H$_{2n}$—X   (I)

in which the groups R, which may be identical to or different from each other, are chosen from: alkyl, alkoxy or aryloxy groups or from halogen atoms, on condition that at least one of the groups R is an alkoxy or aryloxy group; n is an integer between 1 and 6 inclusive; X is a group selected from: nitrous, mercapto, epoxide, vinyl, imido, chloro, —(S)$_m$C$_n$H$_{2n}$Si—(R)$_3$ in which m and n are integers between 1 and 6 inclusive and the groups R are defined as above. Among these, bis(3-trimethoxysilylpropyl)disulfane and bis(3-triethoxysilylpropyl)disulfane, are particularly preferred.

Adhesion promoters (d) that may be used in the present invention are commercially available, for example, under the brand name Silquest® A-187 and Silquest® A-186 from OSi Specialties, Dynasylan® MTMO and Si® 266 from Degussa-Hüls.

The adhesion promoter is preferably added to the crosslinkable composition in an amount of from 0.1 parts by weight to 2.5 parts by weight, more preferably of from 0.3 parts by weight to 1,5 parts by weight relative to 100 parts of (a)+(b).

Conventional additives may be added for the purpose of improving the fundamental characteristics of the abovementioned composition. For example, solvents, plasticizers, surfactants capable of improving the wettability ("wetting") of the coating on the glass portion of the optical fiber, devolatilizing agents, rheological agents, antioxidants, UV stabilizers capable of not interfering with the crosslinking operations may be added.

According to one preferred embodiment, the crosslinkable composition comprises:
(a) about 20–80 parts by weight of at least one epoxidized polydiene oligomer having a first and a second end comprising at least one hydrocarbon chain that is substantially free of ethylenic double bonds, at least one epoxide group at said first end and at least one reactive functional group at said second end;
(b) about 20–80 parts by weight of at least one hydrogenated polydiene oligomer comprising at least one reactive functional group capable of reacting with said epoxide groups;
(c) about 0.05–5 parts by weight relative to 100 parts of (a)+(b) of a photo-initiator.

According to a further preferred embodiment, said crosslinkable composition further comprises about 0.1 parts by weight to 2.5 parts by weight relative to 100 parts of (a)+(b) of an adhesion promoter (d).

As stated above, the abovementioned crosslinkable composition is particularly useful as a primary coating for an optical fiber. Said primary coating is then coated with a secondary coating that is compatible therewith. For example, a secondary coating formed from a crosslinkable composition comprising an epoxidized polydiene oligomer, a reactive diluent monomer and at least one photo-initiator may be used.

The epoxidized polydiene oligomer generally represents from 30% to 70% by weight of the secondary coating composition. The epoxidized polymer is preferably a hydrocarbon polyol such as, for example, partially hydrogenated and epoxidized polybutadiene containing two hydroxyl end groups and internal epoxide groups along the chain.

The reactive diluent monomer present in the composition of the secondary coating is generally used in an amount of up to 400 parts per 100 parts by weight of epoxidized polymer, preferably in an amount of between 40 and 200 parts by weight of epoxidized polymer. Reactive diluent monomers of epoxide type that may advantageously be used are, for example: 3,4-epoxy-cyclohexylmethyl-3,4-epoxy-cyclohexane carboxylate, limonene epoxide, cyclohexene epoxide, 1,2-epoxydodecane. Reactive diluent monomers of vinyl ether type that may advantageously be used are, for example: triethylene glycol divinyl ether, 1,4-butanediol monovinyl ether, 1,4-bis(vinyloxymethyl)cyclohexane. Reactive diluent monomers of oxetane type such as, for example: trimethylene oxide, 3,3-dimethyloxetane, 3,3-dichloromethyloxetane, 3-ethyl-3-phenoxymethyloxetane, bis(3-ethyl-3-methyloxy)butane, or mixtures thereof, may also advantageously be used.

The photo-initiator present in the composition of the secondary coating is generally used in an amount of up to 10 parts per 100 parts by weight of epoxidized polymer, preferably in an amount of between 0.01 and 10 parts. Photo-initiators that may advantageously be used are: hexafluorophosphorus triarylsulphonium salts, hexafluoroantimony triarylsulphonium salts, (tolylcumyl)tetrakis(pentafluorophenyl)iodonium salts, diaryliodonium hexafluoroantimonate salts, or mixtures thereof.

Further additives may be added for the purpose of improving the fundamental characteristics of the composition of the secondary coating. For example, solvents, levelling agents, surface tension modifiers, attrition coefficient modifiers, plasticizers, surfactants, devolatilizing agents, rheological agents, antioxidants, and UV stabilizers capable of not interfering with the crosslinking operations may be added.

Said composition of the secondary coating preferably has a modulus of elasticity at room temperature of less than 2,500 MPa, preferably between about 300 MPa and about 2,000 MPa. Said modulus of elasticity may be determined by means of a DMTA analyser as described above.

Compositions of the type described above which may be used as a secondary coating according to the present invention are described, for example, in patent U.S. Pat. No. 5,993,965.

BRIEF DESCRIPTION OF THE DRAWINGS

The present invention may be understood more clearly with reference to the following attached figures.

DETAILED DESCRIPTION OF THE INVENTION

Figure 1:
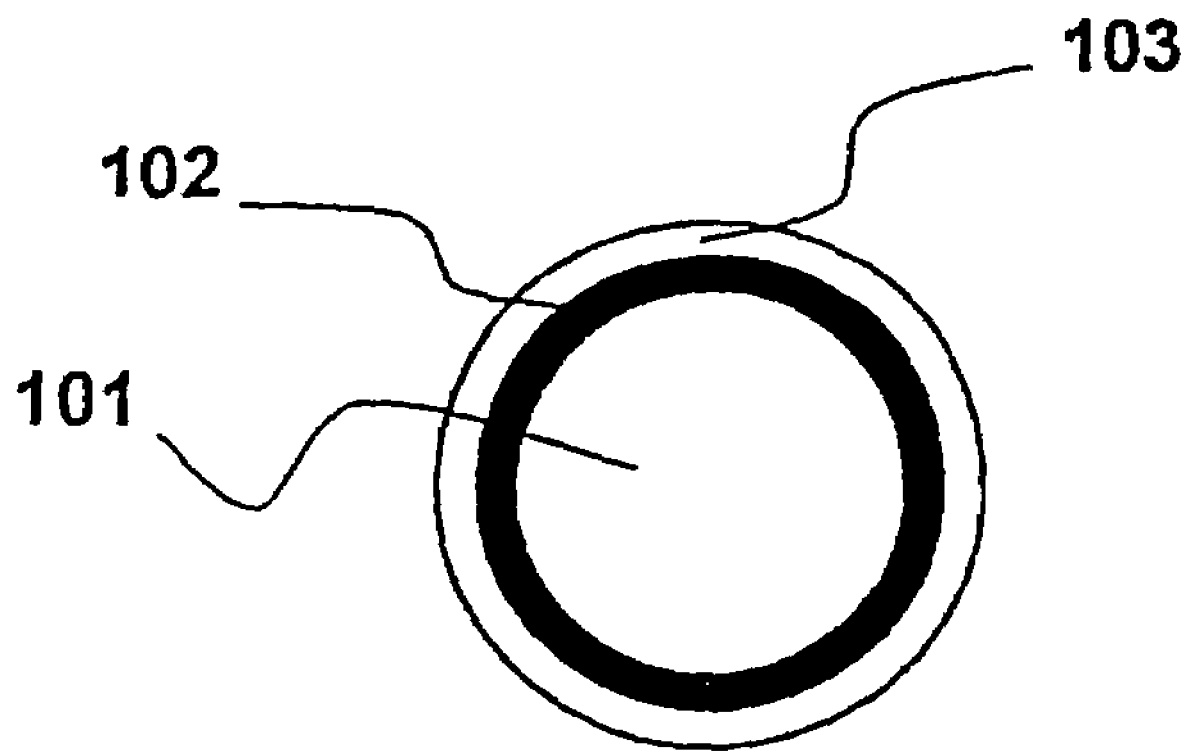
FIG. 1: is a cross section of an optical fiber according to the invention.

FIG. 1 shows an optical fiber according to the present invention, comprising a glass portion (101) covered with a primary coating (102) which may be produced according to the present invention, and which in its turn is covered with a secondary coating (103).

Figure 2:
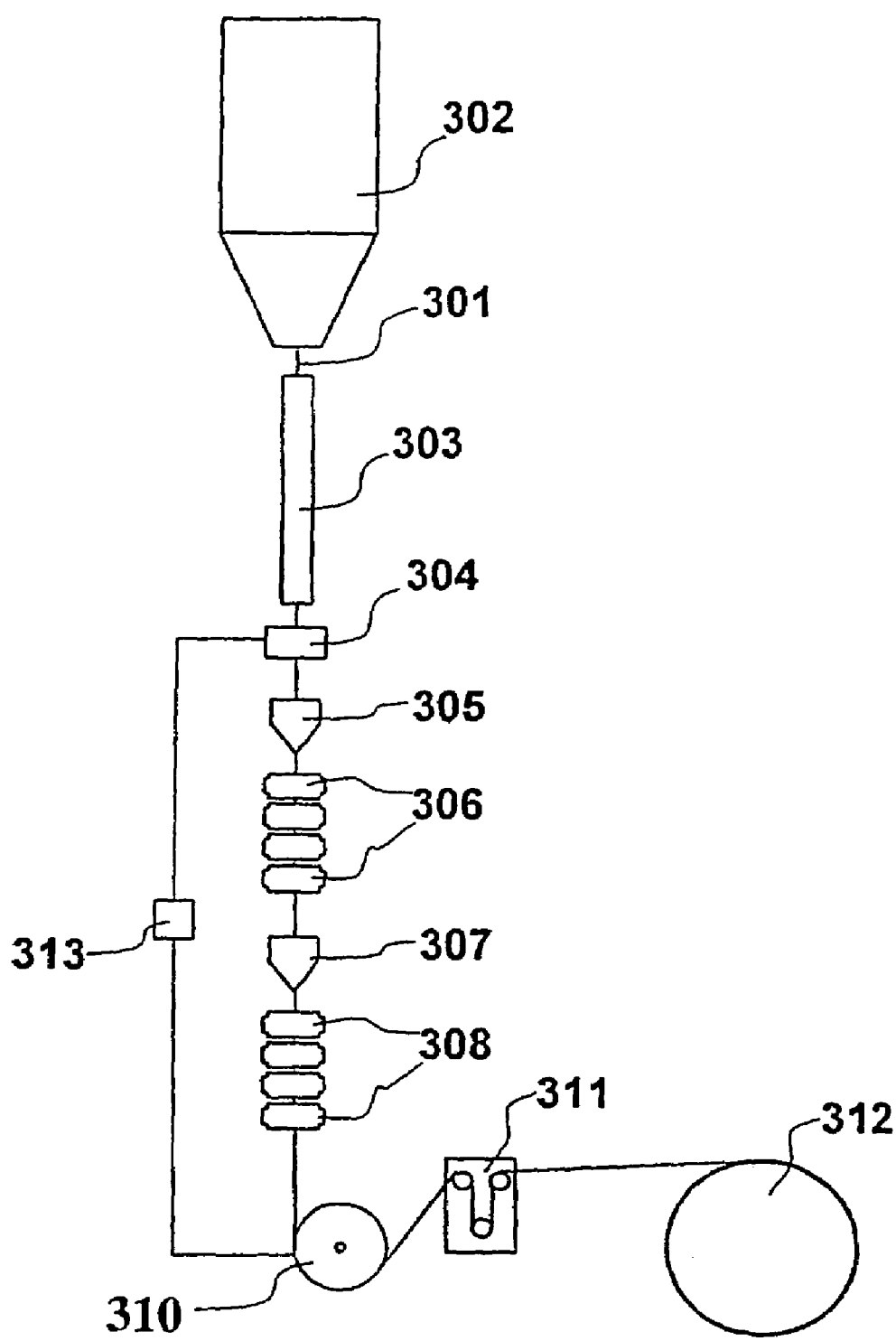
FIG. 2: is the general scheme of a system (spinning tower) for producing an optical fiber according to the invention.

An optical fiber according to the present invention may be produced according to the usual spinning techniques, using, for example, a system such as the one schematically illustrated in FIG. 2.

This system, commonly known as a "drawing tower", typically comprises a furnace (302) inside which is placed a glass optical preform to be drawn. The bottom part of said preform is heated to the softening point and drawn into an optical fiber (301). The fiber is then cooled, preferably to a temperature of not less than 60° C., preferably in a suitable cooling tube (303) of the type described, for example, in patent application WO 99/26891, and passed through a diameter measurement device (304). This device is connected by means of a microprocessor (313) to a pulley (310) which regulates the spinning speed; in the event of any variation in the diameter of the fiber, the microprocessor (313) acts to regulate the rotational speed of the pulley (310), so as to keep the diameter of the optical fiber constant. Then, the fiber passes through a primary coating applicator (305), containing the coating composition in liquid form, and is covered with this composition to a thickness of about 25 μm–35 μm. As stated above, the application of the primary coating is preferably carried out at a temperature of at least 60° C., preferably between 80° C. and 100° C. The coated fiber is then passed through a UV oven (or a series of ovens) (306) in which the primary coating is crosslinked. The fiber covered with the crosslinked primary coating is then passed through a second applicator (307), in which it is coated with the secondary coating and then crosslinked in the relative UV oven (or series of ovens) (308). Alternatively, the application of the secondary coating may be carried out directly on the primary coating before the latter has been crosslinked, according to the "wet-on-wet" technique. In this case, a single applicator is used, which allows the sequential application of the two coating layers, for example, of the type described in patent U.S. Pat. No. 4,474,830. The fiber thus covered is then crosslinked using one or more UV ovens similar to those used to crosslink the individual coatings.

Subsequently to the coating and to the crosslinking of this coating, the fiber may optionally be made to pass through a device capable of giving a predetermined torsion to this fiber, for example of the type described in international patent application WO 99/67180, for the purpose of reducing the PMD ("Polarization Mode Dispersion") value of this fiber. The pulley (310) placed downstream of the devices illustrated previously controls the spinning speed of the fiber. After this drawing pulley, the fiber passes through a device (311) capable of controlling the tension of the fiber, of the type described, for example, in patent application EP 1 112 979, and is finally collected on a reel (312).

An optical fiber thus produced may be used in the production of optical cables. The fiber may be used either as such or in the form of ribbons comprising several fibers combined together by means of a common coating.

Although the present invention has been described with particular reference to a primary coating which is in turn coated with a secondary coating, according to the above-mentioned description it is apparent to those skilled in the art that a crosslinkable formulation according to the present invention may be suitably formulated so as to be used as a secondary coating, or as a single coating for an optical fiber.

The present invention will be further illustrated hereinbelow by means of a number of implementation examples that are provided purely as a guide and are non-limiting on the invention.

EXAMPLES 1–5

Preparation of Compositions for Primary Coating

Compositions for the primary coating according to the invention were prepared: the amounts of the components (parts by weight except where otherwise mentioned) are given in Table 1.

TABLE 1

| | COMPOSITIONS | | | | |
|---|---|---|---|---|---|
| COMPONENTS | 1 (*) | 2 (*) | 3 | 4 | 5 |
| Poly Bd ® 605 | 76 | — | — | — | — |
| Kraton ® Liquid L-207 | — | 80 | 50 | 50 | 50 |
| Kraton ® Liquid L-1203 | — | — | 50 | — | 30 |
| Kraton ® Liquid L-2203 | — | — | — | 50 | 20 |
| Rapicure ® HBVE | 24 | — | — | — | — |
| Rapicure ® CHVE | — | 20 | — | — | — |
| UVI ® 6974 | 1 | 1 | 1 | 1 | 1 |

(*): comparative
Poly Bd ® 605: epoxidized polybutadiene sold by Elf Atochem;
Kraton Liquid ™ EKP-207: linear oligomer containing a poly(ethylene/butylene) aliphatic chain, a hydroxyl group at one end and epoxide groups at the other end, sold by Kraton Polymer;
Kraton Liquid ™ L-1203: hydroxy-terminated hydrogenated polydiene oligomer sold by Kraton Polymer;
Kraton Liquid ™ L-2203: dihydroxy-terminated hydrogenated polydiene oligomer sold by Kraton Polymer;
Rapicure ® HBVE: 4-hydroxybutyl vinyl ether sold by ISP;
Rapicure ® CHVE: cyclohexane dimethanol vinyl ether sold by ISP;
UVI ® 6974: hexafluoroantimony triarylsulphonium salt, a photo-initiator sold by Union Carbide, as a 50% dispersion in propylene carbonate (the amount given is relative to 100 parts of the other components).

The components given in Table 1 were placed in a 100 ml beaker and kept under stirring, at room temperature, for 1 hour. They were then left to stand overnight in order to obtain a homogeneous composition free of bubbles.

EXAMPLE 6

Mechanical and Chemical-physical Analyses

The compositions of Examples 1–5 were subjected to the following mechanical and chemical-physical analyses.

Viscosity

The viscosity of the non-crosslinked compositions obtained according to Examples 1–5 was measured, at 30° C. and at 80° C., using a viscometer of Brookfield type, model DV-III, equipped with a configuration 29. The results obtained are given in Table 2.

Modulus of Elasticity Values

Films were obtained from the abovementioned compositions by working as follows. A film 70 μm in thickness and 120 mm in width was spread onto a glass plate using the "Bird" filmograph at a speed of 2 m per minute; the crosslinking of the film was carried out using a Fusion UV curing System device, model F600 and lamp with spectrum H, applying a UV dose of 1.25 J/cm². At the end of the crosslinking, the films were removed from the glass plate.

The film obtained from the composition of Example 2 was not subjected to further analyses since said composition was found to have undergone little crosslinking; as a matter of fact, said composition had a sticky appearance and left residues on the surface of the glass at the time of removal.

The films thus obtained were conditioned for 24 hours, at 25° C. and at 50% relative humidity, and were then subjected to measurement of the modulus of elasticity by means of a DMTA (Dynamic Mechanical Thermal Analyser from Reometrics Inc.), in traction, at a frequency of 1 Hz and at a heating rate of 2° C./min over the temperature range between –60° C. and 120° C.

The results obtained, relating to the modulus values measured at room temperature (20° C.) and at –40° C., are given in Table 2.

H₂O Absorption of the Crosslinked Films

The films obtained as described above, predried in an atmosphere flushed with dry air for 48 hours, were subjected to, controlled absorption of H₂O. To this end, the Igasorp machine from Hiden Analytical was used, working at a temperature of 55° C., with a relative humidity of 95%, until an asintotic value in the absorption of the water content was reached.

The results obtained, expressed as a percentage absorption of absorbed water, are given in Table 2.

Thermal Ageing

The films obtained as described above were subjected to ageing for 8 days, at 80° C. The reduction in mechanical characteristics, in particular the elongation at break and the stress at break were then evaluated: the results obtained (the percentage variation is reported) are given in Table 2.

To this end, the mechanical characteristics were measured using an INSTRON 4502, Series 9 dynamometer, at a traction speed of 25 mm/mm, on punches 150 mm in height and 20 mm in width obtained from the abovementioned films preconditioned at 25° C., with a humidity of 50%, for 24 hours. For comparative purposes, the mechanical characteristics were also measured on punches obtained from non-aged films.

The percentage variation in the mechanical characteristics was calculated relative to the value of said characteristics measured on punches obtained from the comparative (non-aged) films.

Amount (%) of Extractable Materials After Crosslinking

The amount of extractable materials was measured as follows. The films obtained as described above were immersed in distilled water contained in 250 ml beakers, said beakers were covered so as to limit the evaporation of the water and were then placed in an oven thermostatically maintained at 60° C. The treatment was continued for 15 days, filling up, if necessary, with distilled water when the level decreased. At the end, the extracted material (E) was calculated according to the following formula:

$$E = \frac{W_0 - W_1}{W_0} * 100$$

in which:
 $W_0$ represents the weight of the original film dried at 60° C. for 24 hours;
 $W_1$ represents the weight of the film subjected to the abovementioned treatment and then dried at 60° C. for 24 hours.

The results obtained are given in Table 2.

TABLE 2

|  | COMPOSITIONS | | | | |
| --- | --- | --- | --- | --- | --- |
|  | 1 (*) | 2 (*) | 3 | 4 | 5 |
| Viscosity at 30° C. (poise) | 12.5 | 80.0 | 445 | 650 | 505 |
| Viscosity at 80° C. (poise) | — | — | 19.0 | 27.0 | 20.8 |
| Modulus at 20° C. (MPa) | 102 | — | 1.3 | 2.7 | 2.1 |
| Modulus at –40° C. (MPa) | 2540 | — | 36 | 30 | 34 |
| H₂O absorption (%) | 2.3 | — | 0.45 | 0.70 | 0.50 |
| Elongation at break (% variation) | –94% | — | +6% | –15 | +10 |
| Stress at break (% variation) | +414% | — | +21% | +60 | +39 |
| Extractable materials (%) | 0.9 | — | 0.1 | 0.1 | 0.1 |

(*): comparative

The data given in Table 2 show that the crosslinkable composition according to the present invention (Examples 3, 4 and 5) is better than the comparative composition (Examples 1 and 2). In particular, the crosslinkable composition according to the present invention shows:
 lower modulus values at low temperatures;
 less water absorption;
 less variation in the elongation at break and in the stress at break;
 smaller amount of extractable materials.

EXAMPLES 7–11

Preparation of Compositions for Primary Coating with Adhesion Promoter

Compositions for primary coating with adhesion promoter according to the invention were prepared: the amounts of the components (parts by weight except where otherwise mentioned) are given in Table 3.

TABLE 3

| COMPONENTS | COMPOSITIONS | | | | |
|---|---|---|---|---|---|
| | 7 | 8 | 9 | 10 | 11 |
| (a) Kraton ® Liquid L-207 | 50 | 50 | 50 | 50 | 50 |
| (b) Kraton ® Liquid L-1203 | 50 | 50 | 50 | 50 | 50 |
| BYK ® 361 | 0.5 | 0.5 | 0.5 | 0.5 | 0.5 |
| Silquest ® A-187 | — | 1.0 | — | — | — |
| Silquest ® A-186 | — | — | 1.0 | — | — |
| Dynasylan ® MTMO | — | — | — | 1.0 | — |
| Si ® 266 | — | — | — | — | 1.0 |
| UVI ® 6974 | 0.5 | 0.5 | 0.5 | 0.5 | 0.5 |

Kraton Liquid ™ EKP-207: linear oligomer containing a poly(ethylene/butylene) aliphatic chain, a hydroxyl group at one end and epoxide groups at the other end, sold by Kraton Polymer;
Kraton Liquid ™ L-1203: hydroxy-terminated hydrogenated polydiene oligomer sold by Kraton Polymer;
BYK ® 361: polyacrylate copolymer sold by BYK-Chemie [the amount given is relative to 100 parts of the components (a) + (b)];
Silquest ® A-I87: gamma-glycidoxypropyltrimethoxysilane sold by OSi Specialties [the amount given is relative to 100 parts of the components (a) + (b)];
Siliquest ® A-I86: beta(3,4-epoxycycloexyl)ethyl-trimethoxysilane sold by OSi Specialties [the amount given is relative to 100 parts of the components (a) + (b)];
Dynasylan ® MTMO: gamma-mercaptopropyltrimethoxysilane sold by Degussa-Hüls [the amount given is relative to 100 parts of the components (a) + (b)];
Si ® 266: bis(3-triethoxysilypropyl)disulfane sold by Degussa-Hüls [the amount given is relative to 100 parts of the components (a) + (b)];
UVI ® 6974: hexafluoroantimony triarylsulphonium salt, photo-initiator sold by Union Carbide, as a 50% dispersion in propylene carbonate (the amount given is relative to 100 parts of the components).

The components given in Table 3 were placed in a 100 ml beaker and kept under stirring, at room temperature, for 1 hour. They were then left to stand overnight in order to obtain a homogeneous composition free of bubbles.

EXAMPLE 12

Preparation of a Composition for Secondary Coating

A composition for the secondary coating was prepared: the amounts of the components (parts by weight except where otherwise mentioned) are given in Table 4.

TABLE 4

| COMPONENTS | COMPOSITION |
|---|---|
| (1) Poly Bd ® 605 | 50 |
| (2) Cyracure UVR ® 6105 | 40 |
| (3) Cyracure UVR ® 6000 | 10 |
| (4) UVI ® 6974 | 1.5 |
| (5) BIK ® 361 | 0.5 |

Poly Bd ® 605: epoxidized polybutadiene sold by Elf Atochem;
Cyracure ® UVR-6125: 3,4-epoxycyclohexylmethyl-3,4-epoxycyclohexyl-carboxylate sold by Union Carbide;
Cyracure ® UVR-6000: 3-ethyl-3(hyrdoxymethyl)oxetane sold by Union Carbide;
UVI ® 6974: hexafluoroantimony triarylsulphonium salt, photo-initiator sold by Union Carbide as a 50% dispersion in propylene carbonate [the amount given is relative to 100 parts of the components (1) + (2) + (3)];
BYK ®-361: polyacrylate copolymer sold by BYK-Chemie [the amount given is relative to 100 parts of the components (1) + (2) + (3)].

The components given in Table 4 were placed in a 100 ml beaker and were kept under stirring for 1 hour at room temperature. They were then left to stand overnight so as to obtain a homogeneous composition free of bubbles.

The composition obtained was subjected to the following analyses: viscosity and modulus of elasticity values, working as described above in Example 1. The results obtained are given in Table 5.

TABLE 5

| COMPONENTS | COMPOSITION |
|---|---|
| Viscosity at 26° C. (poise) | 20.1 |
| Modulus at 20° C. (MPa) | 2010 |
| Modulus at −40° C. (MPa) | 2760 |

EXAMPLES 13

Glass Adhesion Measurement

The compositions of Examples 7–12 were subjected to the following analysis.

Glass plates coated with films made from the compositions of Examples 7 to 11 (primary coating) and from the composition of Example 12 (secondary coating) were obtained by working as follows. A film of primary coating (70 μm thick and 100 mm width) was spread onto a glass plate previously conditioned at 130° C. for 10 hours using the "Bird" filmograph at a speed of 1 m per minute; the crosslinking of the film was carried out using a Fusion UV curing System device, model F600 and lamp with spectrum H, applying a UV dose of 1.5 J/cm$^2$. At the end of the crosslinking, a composition for secondary coating prepared according to Example 12, was spread as a film (70 μm thick and 120 mm width) onto the said cross-linked film and was subjected to the crosslinking operating at the working conditions above disclosed.

The glass plates thus obtained were conditioned for 24 hours, at 25° C. and at 50% relative humidity, and were subsequently immersed in distilled water for 24 hours at 25° C. (aged samples). At the end of said ageing treatment, the glass plates were subjected to glass adhesion measurement. To this end, from the above mentioned glass plates samples having about 140 μm in thickness and 40 mm in width were obtained. A traction force in a direction perpendicular to the glass surface at a traction speed of 50 mm/mm was applied to said samples, using an INSTRON 4502, Series 9 dynometer equipped with a movable platform and a load cell of 10 N. In order to work in water saturation conditions, said measurements were carried out not more than 10 minutes after the glass plates were extracted from the water. For comparative purposes, the glass adhesion measurement was also carried out on samples obtained from non-aged films.

The results obtained, expressed in Newton/meter (N/m), are given in Table 6.

TABLE 6

| COMPOSITIONS | NON-AGED FILMS (N/m) | AGED FILMS (N/m) |
|---|---|---|
| 7 | 62.5 | 5.0 |
| 8 | 67.3 | 32.5 |
| 9 | 84.3 | 21.2 |
| 10 | 113.3 | 58.0 |
| 11 | 68.1 | 83.9 |

The data given in Table 6 show that the addition of an adhesion promoter to the crosslinkable composition according to the present invention improve the adhesion between the glass fiber and the primary coating, in particular upon ageing of the coating.

EXAMPLE 14

Production of Optical Fibers

Two optical fibers were produced according to the techniques known in the art, comprising a primary coating according to the present invention (compositions of Examples 7 and 10) and a secondary coating prepared according to Example 12. The primary coating was applied at a temperature of 80° C. as the secondary coating was applied, at a temperature of 26° C. The spinning speed was 14 m/s. The primary coating and the secondary coating were applied to a thickness of 30 µm each.

EXAMPLE 15

Strip Test

Two test specimens of the optical fibers obtained as disclosed in Example 14 were subjected to a strip test according to the Bellcore standard GR-20-CORE, July 1998, section 4.4.2. To this end, the specimens were conditioned at room temperature, with a humidity of 50%, for 7 days and subsequently were immersed in water at 20° C. and at 60° C. for 7 days (aged samples). For comparative purposes, the strip test was also carried out on samples obtained from non-aged specimens.

The result obtained, which are the average of 5 different tests, are given in Table 7.

TABLE 7

| STRIP FORCE VALUE (N) | Example 7 | Example 10 |
| --- | --- | --- |
| NON-AGED | 1.00 | 1.82 |
| AGED (7 days at 20° C.) | 0.00 | 1.00 |
| AGED (7 days at 60° C.) | 0.00 | 0.78 |

The data given in Table 7 show that the addition of an adhesion promoter to a crosslinkable composition according to the present invention improve the adhesion between the glass fiber and the primary coating, in particular upon ageing of the coating.

EXAMPLE 16

Attenuation Measurement

A 1000 m skein of the optical fiber obtained as disclosed in Example 14 comprising a primary coating according to the present invention (composition of Example 7) and a secondary coating prepared according to Example 12, was subjected to attenuation measurements using an OTDR (optical time domain reflectometer) from ANRITSU, model MW 90-60 A.

The attenuation measurements carried out at 20° C. and at 1550 nm gave a value of 0.20 dB/km, while the attenuation measurements carried out at 20° C. and at 1330 nm gave a value of 0.35 dB/km. The use of the primary coating according to the present invention thus gives the optical fiber good attenuation characteristics.

The invention claimed is:

1. An optical fiber comprising at least one epoxidized polyolefin based polymer coating, said coating being formed from a crosslinkable composition comprising:
    (a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
    (b) at least one hydrogenated polydiene oligomer comprising at least one reactive functional group capable of reacting with said epoxide groups; and
    (c) at least one photo-initiator
wherein the at least one hydrogenated polydiene oligomer (b) has an average molecular weight of between about 500 daltons and about 20,000 daltons.

2. The optical fiber according to claim 1, in which said polymer coating is a primary coating.

3. The optical fiber according to claim 1, in which the crosslinkable composition further comprises at least one adhesion promoter (d).

4. The optical fiber according to claim 1, in which the crosslinkable composition further comprises at least one reactive diluent monomer (e).

5. The optical fiber according to claim 1, in which the crosslinkable composition has a modulus of elasticity, at room temperature, of less than about 4 MPa.

6. The optical fiber according to claim 5, in which the crosslinkable composition has a modulus of elasticity, at room temperature, of between 1 MPa and 3 MPa.

7. The optical fiber according to claim 1, in which the crosslinkable composition has a modulus of elasticity, at −40° C., of between 5 MPa and 350 MPa.

8. The optical fiber according to claim 7, in which the crosslinkable composition has a modulus of elasticity, at −40° C., of between 10 MPa and 50 MPa.

9. The optical fiber according to claim 1, in which the epoxidized polydiene oligomer (a) is obtained by anionic (co)polymerization of conjugated diene monomers containing from 4 to 24 carbon atoms, or of disubstituted conjugated diene monomers, or of difluorinated conjugated diene monomers, followed by functionalization, hydrogenation and epoxidation.

10. The optical fiber according to claim 9, in which the epoxidized polydiene oligomer (a) is a diblock copolymer comprising a first block comprising at least one epoxide group, obtained by the polymerization of a first conjugated diene monomer, which is subsequently epoxidized, and a second block formed from a hydrocarbon chain that is substantially free of ethylenic double bonds, obtained by the polymerization of a second conjugated diene monomer, subsequently terminated with at least one reactive functional group and hydrogenated.

11. The optical fiber according to claim 10, in which the first conjugated diene monomer is isoprene.

12. The optical fiber according to claim 10, in which the second conjugated diene monomer is 1,3-butadiene.

13. The optical fiber according to claim 1, in which from 5 to 15 epoxide groups are present in the epoxidized polydiene oligomer (a), at the first end.

14. The optical fiber according to claim 13, in which from 9 to 11 epoxide groups are present in the epoxidized polydiene oligomer (a), at the first end.

15. The optical fiber according to claim 1, in which, in the epoxidized polydiene oligomer (a), the reactive functional group present at the second end is selected from: hydroxyl, acrylate, epoxy, vinyl ether, or mercaptan.

16. The optical fiber according to claim 15, in which, in the epoxidized polydiene oligomer (a), the reactive functional group present at the second end is a hydroxyl group.

17. The optical fiber according to claim 1, in which the epoxidized polydiene oligomer (a) has an average molecular weight of between 3,000 daltons and 15,000 daltons.

18. The optical fiber according to claim 1, in which the epoxidized polydiene oligomer (a) has a viscosity, measured at 30° C. of less than 1,000 poise.

19. The optical fiber according to claim 1, in which the hydrogenated polydiene oligomer (b) has a base polymer structure which is derived from the (co)polymerization of one or more conjugated diene monomers containing 4 to 24 carbon atoms.

20. The optical fiber according to claim 1, in which, in the hydrogenated polydiene oligomer (b), the reactive functional group is selected from: hydroxyl, acrylate, epoxy, vinyl ether, or mercaptan.

21. The optical fiber according to claim 20, in which, in the hydrogenated polydiene oligomer (b), the reactive functional group is a hydroxyl group.

22. The optical fiber according to claim 21, in which, in the hydrogenated polydiene oligomer (b), the hydroxyl group is in an end position.

23. The optical fiber according to claim 22, in, which the hydrogenated polydiene oligomer (b) has a hydroxyl functionality of between about 0.5 and about 2.6.

24. The optical fiber according to claim 22, in which the hydrogenated polydiene oligomer (b) has a hydroxyl-equivalent weight of between about 250 and about 20,000.

25. An optical fiber comprising at least one epoxidized polyolefin based polymer coating, said coating being formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups; and
(c) at least one photo-initiator selected from: hexafluorophosphorus triarylsulphonium salts, hexafluoroantimony triarylsulphonium salts, (tolylcumyl)tetrakis (pentafluorophenyl) iodonium salts, diaryliodonium hexafluoroantimonate salts, or mixtures thereof.

26. An optical fiber comprising at least one epoxidized polyolefin based polymer coating, said coating being formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups; and
(c) at least one photo-initiator; and
(d) at least one adhesion promoter selected from organo-functional silanes.

27. The optical fiber according to claim 26, in which the organo-functional silane is gamma-glycidoxypropyltrimethoxysilane, beta-(3,4-epoxycycloexhyl)ethyltrimethoxysilane, or gamma-mercaptopropyltrimethoxysilane.

28. The optical fiber according to claim 27, in which the organo-functional silane compound is gamma-mercaptopropyltrimethoxysilane.

29. The optical fiber according to claim 27, in which the organo-functional silane has the following structural formula (I):

$$(R)_3Si-C_nH_{2n}-X \qquad (I)$$

in which the groups R, which may be identical to or different from each other, are selected from: alkyl, alkoxy or aryloxy groups or from halogen atoms, on condition that at least one of the groups R is an alkoxy or aryloxy group; n is an integer between 1 and 6 inclusive; X is a group chosen from: nitrous, mercapto, epoxide, vinyl, imido, chloro, or $-(S)_m C_nH_{2n}-Si-(R)_3$ in which m and n are integers between 1 and 6 inclusive and the groups R are defined as above.

30. The optical fiber according to claim 29, in which the organo-functional silane compound is bis(3-trimethoxysilylpropyl)disulfane, or bis(3-triethoxysilylpropyl)disulfane.

31. An optical fiber comprising at least one epoxidized polyolefin based polymer coating, said coating being formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups;
(c) at least one photo-initiator; and
(d) at least one adhesion promoter;
in which the adhesion promoter is added to the crosslinkable composition in an amount of from 0.1 parts by weight to 2.5 parts by weight relative to 100 parts of (a)+(b).

32. The optical fiber according to claim 31, wherein the adhesion promoter is added to the crosslinkable composition in an amount of from 0.3 parts by weight to 1.5 parts by weight relative to 100 parts of (a)+(b).

33. An optical fiber comprising at least one epoxidized polyolef in based polymer coating, said coating being formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups;
(c) at least one photo-initiator; and
(d) at least one reactive diluent monomer selected from vinyl ethers.

34. An optical fiber comprising at least one epoxidized polyolefin based polymer coating, said coating being formed from a crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;

(b) at least one hydrogenated polydiene oligomer comprising at least one reactive functional group capable of reacting with said epoxide groups;
(c) at least one photo-initiator; and
(d) at least one reactive diluent monomer in an amount not greater than 20 parts by weight relative to 100 parts of (a)+(b).

35. A crosslinkable composition comprising:
(a) about 20–80 parts by weight of at least one epoxidized polydiene oligomer having a first and second end, said oligomer comprising at least one hydrocarbon chain that is substantially free of ethylenic double bonds, at least one epoxide group at said first end and at least one reactive functional group at said second end;
(b) about 20–80 parts by weight of at least one hydrogenated polydiene oligomer comprising at least one reactive functional group capable of reacting with said epoxide groups; and
(c) about 0.05–5 parts by weight relative to 100 parts of (a)+(b) of a photo-initiator.

36. The optical fiber according to claim 9, wherein the conjugated diene monomers containing from 4 to 24 carbon atoms, or disubstituted conjugated diene monomers, or difluorinated conjugated diene monomers, are copolymerized with other ethylenically unsaturated monomers.

37. The optical fiber according to claim 19, wherein the one or more conjugated diene monomers containing from 4 to 24 carbon atoms, are copolymerized with other ethylenically unsaturated monomers.

38. A crosslinkable composition comprising:
(a) at least one epoxidized polydiene oligomer having a first and a second end, said oligomer comprising at least one hydrocarbon chain that is substantially free of ethylenic double bonds, at least one epoxide group at said first end and at least one reactive functional group at said second end;
(b) at least one hydrogenated polydiene oligomer comprising at least one reactive functional group capable of reacting with said epoxide groups; and
(c) at least one photo-initiator;

in which the epoxidized polydiene oligomer (a) is obtained by anionic (co)polymerization of conjugated diene monomers containing from 4 to 24 carbon atoms, or of disubstituted conjugated diene monomers, or of difluorinated conjugated diene monomers, followed by functionalization, hydrogenation and epoxidation.

39. The crosslinkable composition according to claim 38, in which the conjugated diene monomers containing from 4 to 24 carbon atoms, or disubstituted conjugated diene monomers, or difluorinated conjugated diene monomers, are copolymerized with other ethylenically unsaturated monomers.

40. The crosslinkable composition according to claim 38, in which the epoxidized polydiene oligomer (a) is a diblock copolymer comprising a first block comprising at least one epoxide group, obtained by the polymerization of a first conjugated diene monomer, which is subsequently epoxidized, and a second block formed from a hydrocarbon chain that is substantially free of ethylenic double bonds, obtained by the polymerization of a second conjugated diene monomer, subsequently terminated with at least one reactive functional group and hydrogenated.

41. The crosslinkable composition according to claim 35, in which the hydrogenated polydiene oligomer (b) has a base polymer structure which is derived from the (co)polymerization of one or more conjugated diene monomers containing 4 to 24 carbon atoms.

42. The crosslinkable composition according to claim 41, in which the one or more conjugated diene monomers containing from 4 to 24 carbon atoms, is copolymerized with other ethylenically unsaturated monomers.

43. The crosslinkable composition according to claim 35 further comprising at least one adhesion promoter (d).

44. The crosslinkable composition according to claim 35 further comprising at least one reactive diluent monomer.

* * * * *

UNITED STATES PATENT AND TRADEMARK OFFICE
CERTIFICATE OF CORRECTION

PATENT NO.      : 7,120,343 B2
APPLICATION NO. : 11/231149
DATED           : October 10, 2006
INVENTOR(S)     : Luca Castellani et al.

It is certified that error appears in the above-identified patent and that said Letters Patent is hereby corrected as shown below:

Claim 23, column 19, line 27, "in, which" should read --in which--.

Claim 27, column 20, lines 1-2, "beta-(3,4-epoxycycloexhyl)ethyltrimethoxysilane," should read --beta-(3,4-epoxycyclohexyl)ethyltrimethoxysilane,--.

Claim 33, column 20, line 44, "polyolef in" should read --polyolefin--.

Signed and Sealed this

Sixth Day of March, 2007

JON W. DUDAS
*Director of the United States Patent and Trademark Office*